Sept. 15, 1964  R. F. CLEAVER ETAL  3,149,334
RADIO DIRECTION FINDING SYSTEM
Filed July 11, 1962  2 Sheets-Sheet 1
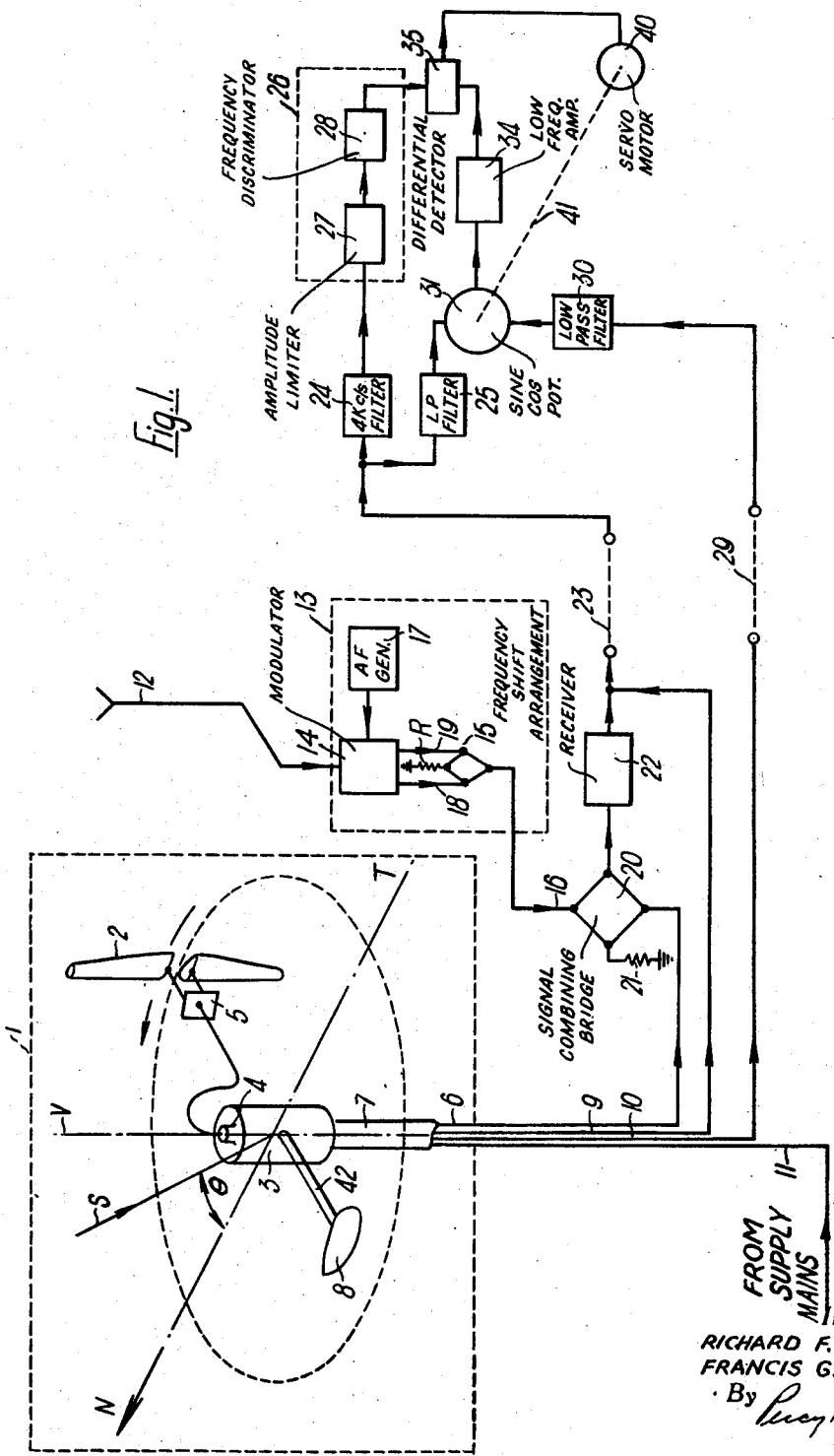
Inventors
RICHARD F. CLEAVER
FRANCIS G. COCKERILL
By
Attorney

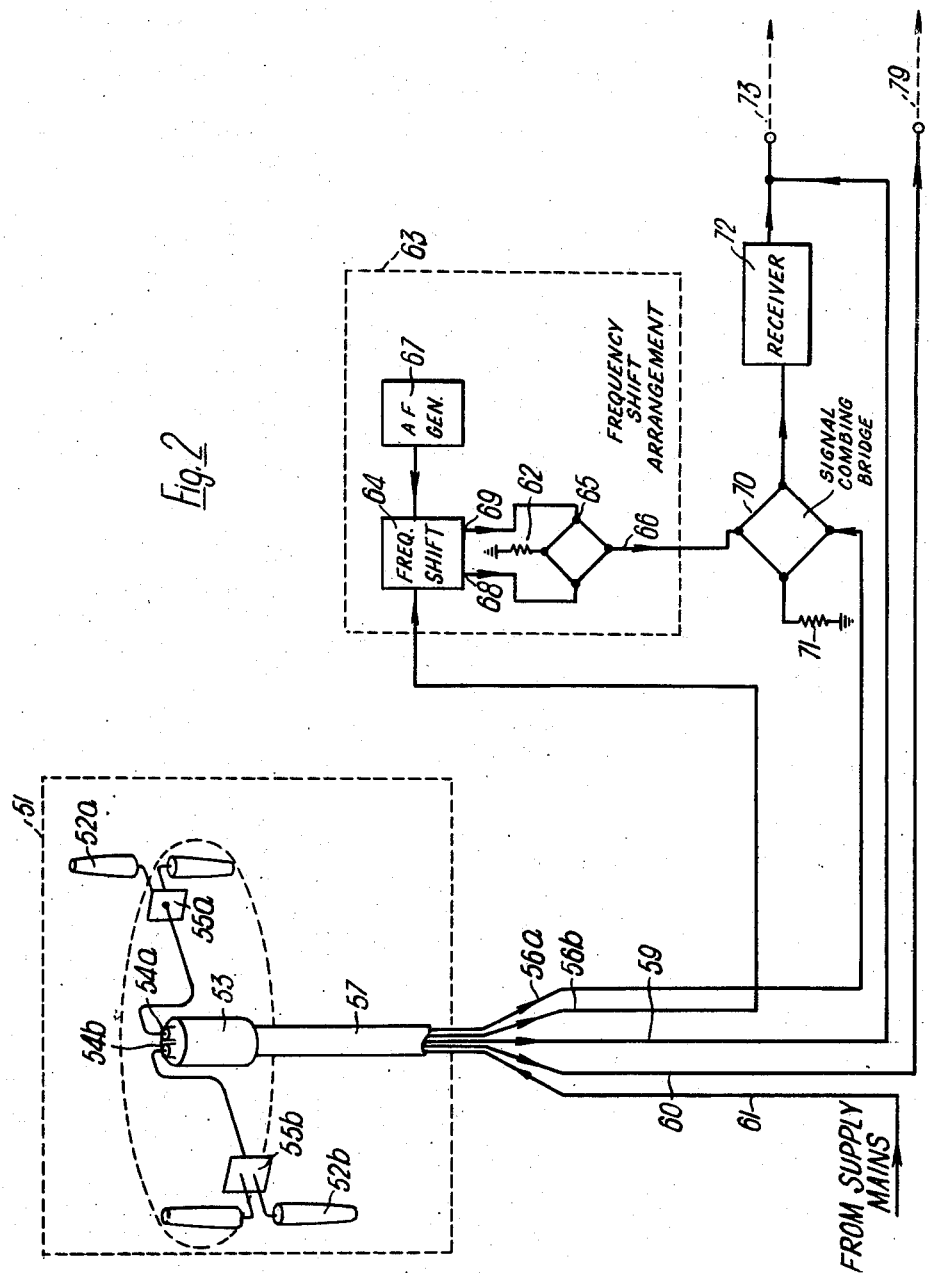

United States Patent Office 3,149,334
Patented Sept. 15, 1964

3,149,334
RADIO DIRECTION FINDING SYSTEM
Richard Francis Cleaver and Francis Geoffrey Cockerill, London, England, assignors to International Standard Electric Corporation, New York, N.Y., a corporation of Delaware
Filed July 11, 1962, Ser. No. 208,986
Claims priority, application Great Britain, Aug. 30, 1961, 31,222/61
8 Claims. (Cl. 343—113)

This invention relates to radio direction-finding systems in which the direction in azimuth of a received signal source is determined by comparison of the phase of a signal wave derived from the received signal with a reference signal of known phase. The invention relates particularly to systems of the above kind in which a received signal is phase modulated by reason of a cyclical change in the length of the space path over which the signal is received.

A convenient method of producing the cyclical change in the space-path over which the signal is received is to cause one or more receiving antennae at the direction finder station to move cyclically along a closed path. Alternatively a number of receiving antennae may be arranged in fixed positions along a closed path, means being provided to connect each of them in succession to the input of a radio receiver at a given frequency.

Each of these two methods of producing the required cyclical change in space-path results in the production of a phase-modulated received signal which may be connected to a direction finder receiver. If the phase varies smoothly and cyclically, either as a result of steady cyclic movement of one or more antennae or by progressive variation of the coupling between the receiver and a series of static antennae arranged along a closed path, the signal supplied to the receiver is also effectively frequency modulated. If the received signal is applied to a frequency modulation detector, an output signal dependent upon the frequency deviation of the received signal about its centre frequency may be obtained from the detector.

The percentage frequency deviation which may be produced in a received signal is proportional to the aperture of the antenna system used, and to either the speed of rotation of a mechanically rotated antenna system, or the rate of commutation of signal energy to the direction-finder receiver from the individual antennae of a fixed antenna system. The aperture and speed of rotation of a mechanically rotated antenna system is strictly limited by practical considerations such as windage and the centrifugal forces which the structure has to withstand. In the case of direction-finding systems which operate in the V.H.F. and U.H.F. bands, the maximum frequency deviation which can conveniently be produced by a physically rotating antenna system may be masked by random frequency variations occurring at the source of the received signal. For example, a single receiving antenna moving on a circular path of radius 4 feet at an angular velocity of 300 r.p.m. produces a frequency deviation of approximately ±0.000012% of an unmodulated signal frequency of 125 mc./s.

The present invention includes a direction-finding receiving system capable of operating with signals having very small frequency deviations of the above mentioned order. This invention, however, is not limited to applications in which the frequency deviation is of such small magnitude.

According to one aspect of the invention there is provided a radio direction finding system including a first antenna system having antenna means to receive signals at successive points on a circumferential path, a second antenna system, a signal combining circuit, means to connect the signal combining circuit to the first antenna at successive positions on the said circumferential path, a connection between the second antenna arrangement and the signal combining circuit, a frequency shift circuit arrangement in the connection between the signal combining circuit and one of the antenna arrangements, an amplitude modulation detector, circuit means to connect an output from the signal combining circuit to the amplitude modulation detector, a frequency modulation detector, circuit means to connect the output from the amplitude modulation detector to the frequency modulation detector, means to obtain a reference signal of known phase and having a frequency integrally related to the frequency of connection of the signal combining circuit to the first antenna arrangement at any one of the successive positions on the said circumferential path, means to compare the phase of the output signal from the frequency modulation detector with the phase of the reference signal, and means to provide an indication of the phase difference thereof.

Embodiments of the invention will now be described with reference to the accompanying drawings in which:

FIG. 1 illustrates a first embodiment of the invention in block schematic form, and FIG. 2 illustrates part of a second embodiment of the invention in block schematic form.

Referring to FIG. 1, there is shown within the dash line 1 a first antenna arrangement which includes a stream-lined vertical half-wave dipole 2. This dipole 2 is driven in a circular path about a vertical axis V by an antenna drive unit 3. The dipole 2 produces a balanced signal output which is converted to unbalanced form by a printed-circuit type transformer 5. A capacitor coupling 4 transfers the signal energy from the secondary side of the transformer 5 to a stationary coaxial cable 6, housed within a hollow stationary shaft 7.

The antenna drive unit 3 includes an electric motor having internal field windings mounted on the stationary shaft 7 and an external rotor which turns at 300 r.p.m. Two radial arms (not shown) are attached to the rotor casing of the induction motor, one radial arm (not shown) supporting the dipole 2, and the other 42 supporting a stream-lined counter-weight 8 to balance the structure dynamically. The antenna drive 3 also includes a 2 phase alternator (not shown) which is integral with the induction motor. The armature windings of the alternator are mounted on the stationary shaft 7 and a rotating field is provided by permanent magnets carried by the rotor of the induction motor.

Two 5 c./s. reference tones in phase quadrature are generated by the alternator and are carried by the conductors 9 and 10. Electrical power is supplied from 50 s./s. A.C. mains to the antenna drive unit 3 via the conductor 11. Conductors 9, 10 and 11, as well as the coaxial cable 6, all pass through the hollow stationary shaft 7 of the antenna drive unit 3.

A second antenna, which is stationary, is shown at 12. The signal received by this antenna is fed to a frequency shift arrangement shown at 13. The frequency shift arrangement comprises a balanced modulator 14, an audio frequency generator 17 having an output at 4 kc./s. connected to the modulator 14, and transmission-line bridge 16. The output from the modulator 14 is applied to the bridge 15 via transmission lines 18 and 19. An output from the bridge 15 is connected via a conductor 16 to the junction of one pair of arms of a second transmission line bridge 20 which functions as a signal combining circuit. A second output of the bridge 15 is loaded by a load resistor R. The signal received by the rotating antenna 2 is connected via the coaxial cable 6 to the junction of the opposite pair of arms of the bridge 20. The bridge 20 is loaded on one side by a load 21, and on the opposite side it is connected to the input of a communications-type receiver 22 capable of responding to amplitude modulated signals.

The audio frequency output from the receiver includes a frequency modulated tone of centre frequency 4 kc./s. caused by the beating together of the two received signals, and this tone is conveyed over a first telephone line 23 to the bearing resolution and display apparatus located in the airfield control tower. One phase of the reference alternator output is also conveyed over the same telephone line 23. At the receiving end of line 23, the frequency modulated and reference components are separated by band-pass filter 24 and a low-pass filter 25. From the output of the filter 24 connection is made to the input of a frequency modulation detector 26, which comprises an amplitude limiter 27 and a frequency discriminator 28.

A second phase of the reference signal generated by the alternator is carried by the conductor 10 and a second telephone line 29 to the input of a second low pass filter 30, having a cut-off frequency of 30 c./s. A bearing indicator 31 has one pair of input terminals connected to the output from filter 25. An output from the bearing indicator 31 is amplified in the amplifier stage 34 and fed to one pair of input terminals of a differential detector 35. A second pair of input terminals of the differential detector 35 is connected to the output terminals of the frequency discriminator 28. The D.C. output signal from the differential detector 35 drives a D.C. servo-motor 40 which actuates the shaft of the bearing indicator 31 by means of a mechanical coupling 41.

If the antenna 2 is rotated on a circular path of diameter $d$ metres at an angular velocity of $p$ radians/second the peripheral speed of the antenna will be $pd/2$ metres/second. As is well known one advantage of using a wide aperture D.F. antenna system is to achieve reduction in site error. In this embodiment a suitable value for the diameter of the circular path traversed by the rotating antenna is $\lambda$, where $\lambda$ is the wavelength of the received signal. In the case of a remote signal source situated along a line, shown at S, having a bearing $\theta$ in azimuth from true north, indicated by the line TN, the velocity of the antenna, rotating in the direction shown, with respect to the wave-front of the signal source will be greatest at angles of $\theta+90°$ and $\theta-90°$ with respect to TN. Putting $d=\lambda$, if the rotation of the antenna 2 is in opposite sense with respect to that of $\theta$, it follows that the antenna 2 will have a maximum velocity of approach to the signal source of $$\pm \frac{p}{2} \text{ wavelengths/second}$$

corresponding to respective angular positions of the antenna of $\theta+90°$ in relation to TN. At angular positions of the antenna 2 of $\theta$ and $\theta+180°$ with respect to TN, the velocity of the antenna 2 will be zero with respect to the signal source.

Since the velocity of the rotating antenna relative to the signal source is, by definition, equal to the rate of change of distance between them, it follows that the rate of change of phase of the signal received by the rotating antenna 2 will vary accordingly. The signal received by the antenna 2 is therefore cyclically phase modulated at a repetition frequency equal to the frequency of its rotation. A corresponding frequency modulation results from the phase modulation of the received signal. Defining the zero of time, $t=0$, as the moment when the antenna is travelling due north, we can express mathematically the signal received by the rotation antenna 2 as $$e = E \sin \left[ \omega t + \frac{p}{2} \cos (pt + \theta) \right]$$

where $\omega/2\pi$ is the unmodulated frequency of the received signal
and $p/2\pi$ is the rotational speed of the antenna in revs. per second.

The received signal is therefore frequency modulated with a modulation index of $p/2 \div p/2\pi$, i.e. $\pi$.

This embodiment is designed to operate with received signal frequencies of the order of 125 mc./s. and, as previously stated, the diameter of the antenna path made equal to one wavelength of the received signal, i.e. 8 feet, approximately. A suitable speed of rotation is 300 r.p.m., making $p/2\pi$ equal to 5. The frequency deviation which is given by the product of the modulation index and the rotational speed of the antenna, is therefore equal to $$\pm \frac{p}{2} \text{c./s., i.e. } \pm 5\pi \text{ c./s.}$$

The phase of this frequency modulation, in relation to the 5 c./s. reference wave previously referred to, has to be measured in order to obtain the bearing.

The signal received by the stationary antenna 12 is not, of course, subjected to the phase modulation undergone by the signal received by the rotating antenna 2. The frequency of the signal received by antenna 12 is therefore constant, apart from random variations due to any instability of the received signal source.

The frequency of the signal received by the stationary antenna 12 is shifted by a fixed amount in the frequency shift arrangement 13. The value of the frequency displacement used in this embodiment is 4 kc./s. The modulator 14 is a balanced (carrier suppressing) arrangement of the kind in which the radio frequency carrier energy is amplitude modulated by reason of the cyclical variation of the capacitance of a number of variable capacitors connected between the carrier source and one or more signal loads. The capacitance of the capacitors is varied sinusoidally by the 4 kc./s. modulating signal wave. The basic circuit arrangement is shown in FIG. 1 of British Patent No. 895,304. In the present embodiment, the variable capacitors consist of semiconductor diodes whose barrier capacitances are individually varied by variation of the reverse bias applied to the capacitors by the modulating signal wave. The modulating signal wave is derived from the audio frequency generator 17.

The balanced output from the modulator 14 is applied via the transmission lines 18 and 19 to the transmission line bridge 15. Three of the four arms of the bridge 15 consist of transmission lines of 90° electrical length.

The fourth arm of the bridge 15 consists of a 270° length of transmission line. The terminal of the bridge 15 is connected to a resistive load R. The opposite terminal of the bridge 15 is connected via the conductor 16 to the signal combining bridge circuit 20. The impedances of R and the input of the bridge 20 are equal.

The electrical length of the transmission line 19 is 90° greater than that of the transmission line 18. Under the above conditions the total output power from the bridge is equally divided between two equal loads in which the currents are shifted in frequency by +4 kc./s. and −4 kc./s. the latter being fed to the combining circuit 20. The use of the bridge 15 ensures that there will be no interaction between the two branches of the modulator 14 over the operating frequency band. The operation of the frequency shift arrangement 13 is described in greater detail in British Patent Nos. 895,305 and 895,304.

Although an electronic modulator has been chosen for this embodiment, it would be also feasible to use a mechanical capacitance modulator of the type described in British Patent No. 895,304, in which case a convenient value for the frequency shift would be, say, 150 c./s.

The signal received from the rotating antenna 2 and the frequency shifted signal from the stationary reference antenna 12 are combined in the combining circuit 20. The combining circuit also consists of a transmission line bridge having three arms of 90° electrical length and a fourth arm of 270° electrical length. The use of the transmission line bridge 20 serves to isolate the two signal sources from each other. One side of the transmission line bridge is loaded by a dummy load 21; the opposite side is connected to the input terminals of the communications receiver 22. The combined signals present at the input terminals of the receiver 22 therefore consist of a R.F. signal, frequency-modulated at 5 c./s. and having a frequency deviation of ±5π c./s. combined with an unmodulated reference signal shifted in frequency by −4 kc./s. with respect to the former. Due to losses in the frequency shift arrangements, the amplitude of the unmodulated signal is at about ⅓ that of the frequency-modulated signals.

The receiver 22 is a V.H.F. communications receiver of conventional design having an A.M. detector and capable of delivering an output signal of 1 mw. at 4 kc./s. into a 600-ohm line. The two received signals beat together in the receiver A.M. detector to produce an output component having a centre frequency of 4 kc./s., frequency-modulated at 5 c./s. (the rotational frequency of antenna 2) and having a frequency deviation of ±5π c./s.

Any frequency instability of the received signal source will not affect the stability of the output signal from the receiver 22, since this output signal is obtained by beating together the two received signals. Both the received signals would be subject to the said frequency instability.

All the above equipment is housed in the D.F. station and the receiver output signal, containing the bearing information, is conveyed from the audio output terminals of the receiver 22 over the telephone line 23 to equipment installed in the airfield control tower.

In order to receive A.M. speech traffic accompanying the D.F. information, a low pass filter (not shown) having a cut-off frequency of about 3 kc./s. is inserted in the audio output of the receiver 22, in order to separate the D.F. information and frequency-shifted speech components from the normal speech signals.

Signals from one of the two phases of the reference alternator are also fed over the telephone line 23 to the control tower. Signals from this phase of the reference alternator will henceforth be referred to as the "in-phase reference signal component."

At the control tower, the in-phase-reference signal component is separated from the D.F. information signal by means of the low-pass filter 25, which has a cut-off frequency of about 30 c./s., and is then applied to the bearing indicator 31. Similarly the D.F. information signal is separated from the in-phase reference signal component by the 4 kc./s. band-pass filter 24.

The D.F. information signal is limited in the amplitude limiter 27 and detected in the frequency discriminator 28, which is of well-known form. It comprises two tuned circuits having resonant frequencies displaced respectively above and below the centre frequency of the frequency modulated signal, and rectifier circuits connected across the tuned circuits in such a way as to provide a 5 c./s. output voltage whose magnitude and polarity varies in accordance with the frequency excursions of the frequency modulated signal. The output signal from the frequency discriminator may be expressed mathematically in the form $$e_0' = E_0 \cos(pt + \theta)$$

where $p/2\pi$ is the rotational frequency of the antenna 2 in cycles per second and $\theta$ is a measure of the bearing of the received signal.

In order to obtain the desired bearing information it is necessary to compare the phase of this signal with the 5 c./s. alternator reference signal.

There are many well-known methods by which this may be carried out. This embodiment uses the well-known sine/cosine potentiometer.

The in-phase signal component of the reference signal is applied to the cosine portion of the sine-cosine potentiometer 31, via the telephone line 23 and the low-pass filter 25, as previously stated. The second or "quadrature" phase component of the reference signal is applied via the telephone line 29 and the low-pass filter 30, to the sine portion of the sine-cosine potentiometer 31. The low-pass filter 30 is similar to filter 25 and is inserted to preserve the quadrature relationship between the two reference phases. The output signals from the two parts of the potentiometer 31 are suitably combined so that the resultant has a phase which varies degree-for-degree with the rotation of the potentiometer shaft. The adjustable phase signal is amplified in the low frequency amplifier 34 and applied to one input of the differential detector 35, which is of conventional design. The 5 c./s. D.F. information signal is applied to the other input of the differential detector 35.

When the adjustable phase signal and the variable phase D.F. information signal are in exact phase quadrature at the input of the differential detector 35, no signal output is obtained from the detector. When the two signals at the differential detector input are not in exact phase quadrature a D.C. output signal is obtained, the polarity of which depends upon whether the D.F. signal lags or leads relative to the quadrature condition.

It is arranged that when the D.F. and variable phase signals attain the quadrature condition, the shaft of the potentiometer 31 indicates the bearing $\theta$ on a 360° scale. If these signals are not in phase quadrature, the shaft of the potentiometer 31 is driven by the servo-motor 40 which is actuated by the D.C. output from the differential detector 35 via the mechanical coupling 41.

An alternative method of providing the bearing indication is described in our co-pending U.S. Patent application filed July 11, 1962, Serial No. 209,017.

A second embodiment of the invention will now be described with reference to FIG. 2 of the accompanying drawings. A rotating antenna arrangement 51 includes two stream-lined vertical half-wave dipoles 52a and 52b, diametrically opposed to one another, which are driven in a circular path by an antenna drive unit 53. The balanced signal outputs from the dipoles 52a and 52b are converted to unbalanced form by printed-circuit type transformers 55a and 55b. Two capacitative couplings 54a and 54b transfer the received signal energy from the secondary side of the transformers 55a and 55b to stationary coaxial cables 56a and 56b respectively, housed within a hollow stationary shaft 57.

The components of the rotary antenna arrangement 51 are individually similar to those used in the antenna arrangement 1 of the first embodiment, illustrated in FIG. 1. The antenna drive unit 53 includes an 18-pole squirrel cage induction motor (not shown), having field windings attached to the stationary shaft 57 and also includes a 2-phase reference alternator (not shown) which is integral with the induction motor.

Two quadrature reference phases are generated by the alternator and are conveyed via conductors 59 and 60 and telephone lines 73 and 79 to the control tower. Here the reference phases are applied to a bearing indicator in the same way as in FIG. 1. Power is supplied to the antenna drive induction motor via the conductor 61. Received signals from the antenna 52a are applied via the coaxial cable 56a to one input of a signal combining circuit 70, which comprises a transmission line bridge. Received signals from the antenna 52b are applied via the coaxial cable 56b to the input of a frequency-shift circuit arrangement 63, which includes a balanced modulator 64, an audio frequency generator 67, having an output connected to the modulator 64, and a transmission-line bridge 65. The balanced signal outputs from the modulator 64 are connected via the transmission lines 68 and 69 to the input terminals of the transmission line bridge 65. One output from the bridge 65 is connected to a dummy load 62, and the other output is connected via the coaxial cable 66 to the second input of the signal combining circuit 70.

One output of the signal combining circuit 70 is connected to a dummy load 71, the other output is connected to the input terminals of a communications-type radio receiver 72, having an amplitude modulation detector. An audio output from the receiver 72 is applied over a telephone line 73 to the control tower.

All the remaining elements of the system are as described in the first embodiment and shown in FIG. 1.

The frequency shift circuit arrangement 63 is identical with that described in the first embodiment and the same remarks apply to the transmission line bridge which constitutes the signal-combining circuit 70. The frequency shift applied to the signal from the antenna 52b is again 4 kc./s.

Two signals are therefore present at the input terminals of the receiver 72, both of which are frequency modulated at a rate corresponding to the rotational frequency of the antenna arrangement, which, as in the previous arrangement, is 5 c./s.

A frequency-modulated tone having a centre frequency of 4 kc./s. is obtained from the audio frequency output of the receiver 72. This results from the beating together of the two received signals in the A.M. detector of the receiver. Since the two antennae 52a and 52b are diametrically opposed, it follows that the maximum phase displacement between the respective received signals is twice that obtained in the previous embodiment, having an antenna arrangement consisting of a single antenna rotating on the same radius and a stationary reference antenna. If also the speed of rotation of the two antennae is the same as that of the single antenna in the previous embodiment it follows that the rate of change of phase displacement, i.e. the frequency deviation is doubled. The 4 kc./s. frequency modulated tone obtained from the audio output terminals of the receiver 72 therefore has a frequency deviation of $2 \times 5 \pi$ c./s.$= 10\pi$ c./s. The modulating frequency remains unchanged at 5 c./s.

The method by which the bearing information is extracted from the frequency modulated audio output from the receiver 72 and the apparatus used is identical with that shown in FIG. 1.

The second embodiment is preferred because of the doubling of the frequency deviation for a given speed of rotation of the antenna arrangement. The second embodiment is also preferred because the unwanted effects due to interaction between each rotating antenna and the antenna mast tend to cancel when two antennae are used.

It should be noted that the figures given for speed of rotation of the antennae, dimensions, frequency shift and the like are merely illustrative and could be varied without departing from the essence of the invention. Also in the description of the transmission line bridges 15, 20, 65 and 70 the references to 90° and 270° phase shifts represent those obtained under ideal conditions, corresponding, say, to the mid-band frequency of the current V.H.F. civil aviation band 118–136 mc./s. The circuit arrangements described are not critically dependent on frequency and have been shown by experiment to operate over the band without readjustment.

Means other than those described may be used to avoid interaction between the two sources of signal connected to the signal combining circuit arrangements represented by 15, 20, 65 and 70. For example, buffer amplifiers can be used in place of the transmission line bridges used in the embodiment. The two signals to be combined may then be applied to the input terminals of individual buffer amplifiers having a common output load across which the combined signal output voltage may be obtained. Such means would be preferred in cases where wide operating frequency bands have to be covered.

What we claim is:

1. A radio direction finding system including a first antenna system having antenna means to receive signals at successive points on a circumferential path, a second antenna system, a signal combining circuit, means to connect the signal combining circuit to the first antenna system at successive positions on the said circumferential path, a frequency shift circuit, means coupling said second antenna system to said frequency shift circuit, means coupling the output of said frequency shift circuit to said signal combining circuit, an amplitude modulation detector, circuit means to connect an output from the signal combining circuit to the amplitude modulation detector, a frequency modulation detector, circuit means to connect the output from the amplitude modulation detector to the frequency modulation detector, means to obtain a reference signal of known phase and having a frequency integrally related to the frequency of connection of the signal combining circuit to the first antenna arrangement at any one of the successive positions on the said circumferential path, means to compare the phase of the output signal from the frequency modulation detector with the phase of the reference signal, and means to provide an indication of the phase difference thereof.

2. A radio direction finding system as claimed in claim 1, in which the first antenna system includes a single antenna capable of mechanical rotation on a circular circumferential path.

3. A radio direction finding system including a first antenna system having antenna means to receive signals at successive points on a circumferential path, a second antenna system, a signal combining circuit, means to connect the signal combining circuit to the first antenna system at successive positions on the said circumferential path, a connection between the second antenna arrangement and the signal combining circuit, said first antenna system including a signal antenna capable of mechanical rotation on a circular circumferential path and is rotated on said circumferential path at an angle of 180 degrees out of phase with said second antenna system, a frequency shift circuit arrangement in the connection between the signal combining circuit and one of the antenna arrangements, an amplitude modulation detector, circuit means to connect an output from the signal combining circuit to the amplitude modulation detector, a frequency modulation detector, circuit means to connect the output from the amplitude modulation detector to the frequency modulation detector, means to obtain a reference signal of known phase and having a frequency integrally related to the frequency of connection of the signal combining circuit to the first antenna arrangement at any one of the successive positions on the said circumferential path, means to compare the phase of the output signal from the frequency modulation detector with the phase of the reference signal, and means to provide an indication of the phase difference thereof.

4. A radio direction finding system including a first antenna system having antenna means to receive signals at successive points on a circumferential path, a second antenna system, a signal combining circuit, means to connect the signal combining circuit to the first antenna system at successive positions on the said circumferential path, a connection between the second antenna arrangement and the signal combining circuit, said first antenna system including a number of antennas, one of which is located at each of said successive points and said second antenna system includes a stationary antenna, a frequency shift circuit arrangement in the connection between the signal combining circuit and one of the antenna arrangements, an amplitude modulation detector, circuit means to connect an output from the signal combining circuit to the amplitude modulation detector, a frequency modulation detector, circuit means to connect the output from the amplitude modulation detector to the frequency modulation detector, means to obtain a reference signal of known phase and having a frequency integrally related to the frequency of connection of the signal combining circuit to the first antenna arrangement at any one of the successive positions on said circumferential path, means to compare the phase of the output signals from the frequency modulation detector with the phase of the reference signal, and means to provide an indication of the phase difference thereof.

5. A radio direction finding system as claimed in claim 4, in which the frequency shift circuit arrangement includes a balanced modulator and a transmission line bridge connected to the output terminals of the balanced modulator by two transmission lines differing in electrical length by substantially 90°, the total electrical length of the pair of arms connected to any one junction of said bridge differing by substantially 180° from the total electrical length of the pair of arms connected to the diagonally opposite junction of the bridge.

6. A radio direction finding system as claimed in claim 4, in which the frequency shift circuit arrangement includes a balanced modulator and two buffer amplifiers, the input circuit of each of the buffer amplifiers being coupled to one branch of the output circuit of the balanced modulator and the output circuits of the buffer amplifiers including a common load impedance.

7. A radio direction finding system as claimed in claim 6 in which the signal combining circuit includes a transmission line bridge, the total electrical length of the pair of arms connected to any one junction of the said bridge differing by substantially 180° from the total electrical length of the pair of arms connected to the diagonally opposite junction of the bridge.

8. A radio direction finding system as claimed in claim 6 in which the signal combining circuit includes two buffer amplifiers having a common output load, the input terminals of the buffer amplifiers being respectively connected to the output terminals of the frequency shift circuit arrangement and to the first antenna system.

References Cited in the file of this patent
UNITED STATES PATENTS

| | | |
|---|---|---|
| 2,481,509 | Hansel | Sept. 13, 1949 |
| 2,860,336 | Earp et al. | Nov. 11, 1958 |